United States Patent
Moreau et al.

(10) Patent No.: US 10,859,296 B2
(45) Date of Patent: Dec. 8, 2020

(54) RESERVOIR OF PHASE-CHANGE MATERIAL EQUIPPED WITH A FILLING TUBE FOR FILLING THE SAID RESERVOIR FOR A HEAT EXCHANGER OF A MOTOR VEHICLE AIR CONDITIONING INSTALLATION

(71) Applicant: Valeo Systemes Thermiques, Le Mesnil Saint Denis (FR)

(72) Inventors: Sylvain Moreau, Le Mesnil Saint Denis (FR); Lionel Robillon, Le Mesnil Saint Denis (FR); Frédéric Tison, Le Mesnil Saint Denis (FR); Patrick Hoger, Le Mesnil Saint Denis (FR); Frédéric Martin, Le Mesnil Saint Denis (FR); Erwann Quistinic, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 163 days.

(21) Appl. No.: 16/081,273

(22) PCT Filed: Feb. 17, 2017

(86) PCT No.: PCT/FR2017/050358
§ 371 (c)(1),
(2) Date: Aug. 30, 2018

(87) PCT Pub. No.: WO2017/149218
PCT Pub. Date: Sep. 8, 2017

(65) Prior Publication Data
US 2019/0072304 A1    Mar. 7, 2019

(30) Foreign Application Priority Data
Mar. 1, 2016  (FR) ..................................... 16 00339

(51) Int. Cl.
F25B 39/02    (2006.01)
F28D 1/03    (2006.01)
(Continued)

(52) U.S. Cl.
CPC .......... F25B 39/022 (2013.01); F28D 1/0333 (2013.01); F28D 20/02 (2013.01);
(Continued)

(58) Field of Classification Search
CPC .............. F25B 39/022; F25B 2339/042; F28D 2021/0085; F28D 1/0333; F28D 20/02;
(Continued)

(56) References Cited

U.S. PATENT DOCUMENTS

2011/0239696 A1    10/2011  Takagi
2013/0284395 A1    10/2013  Kamoshida et al.
(Continued)

FOREIGN PATENT DOCUMENTS

FR    3 007 514 A1    12/2014
FR    3007514 A1 *  12/2014    ........... F28D 1/0341
(Continued)

OTHER PUBLICATIONS

International Search Report issued in PCT/FR2017/050358 dated Jun. 9, 2017 (3 pages).
(Continued)

*Primary Examiner* — Henry T Crenshaw
*Assistant Examiner* — Kamran Tavakoldavani
(74) *Attorney, Agent, or Firm* — Osha Bergman Watanabe & Burton LLP

(57) ABSTRACT

The invention relates to a phase-change material reservoir 9 for a heat exchanger of an air-conditioning installation of a vehicle, the reservoir 9 being arranged between two reservoir plates 10a, 10b and having filling means 14, characterized in that the filling means 14 include at least one tube (Continued)

Figures 1, 2, 3:
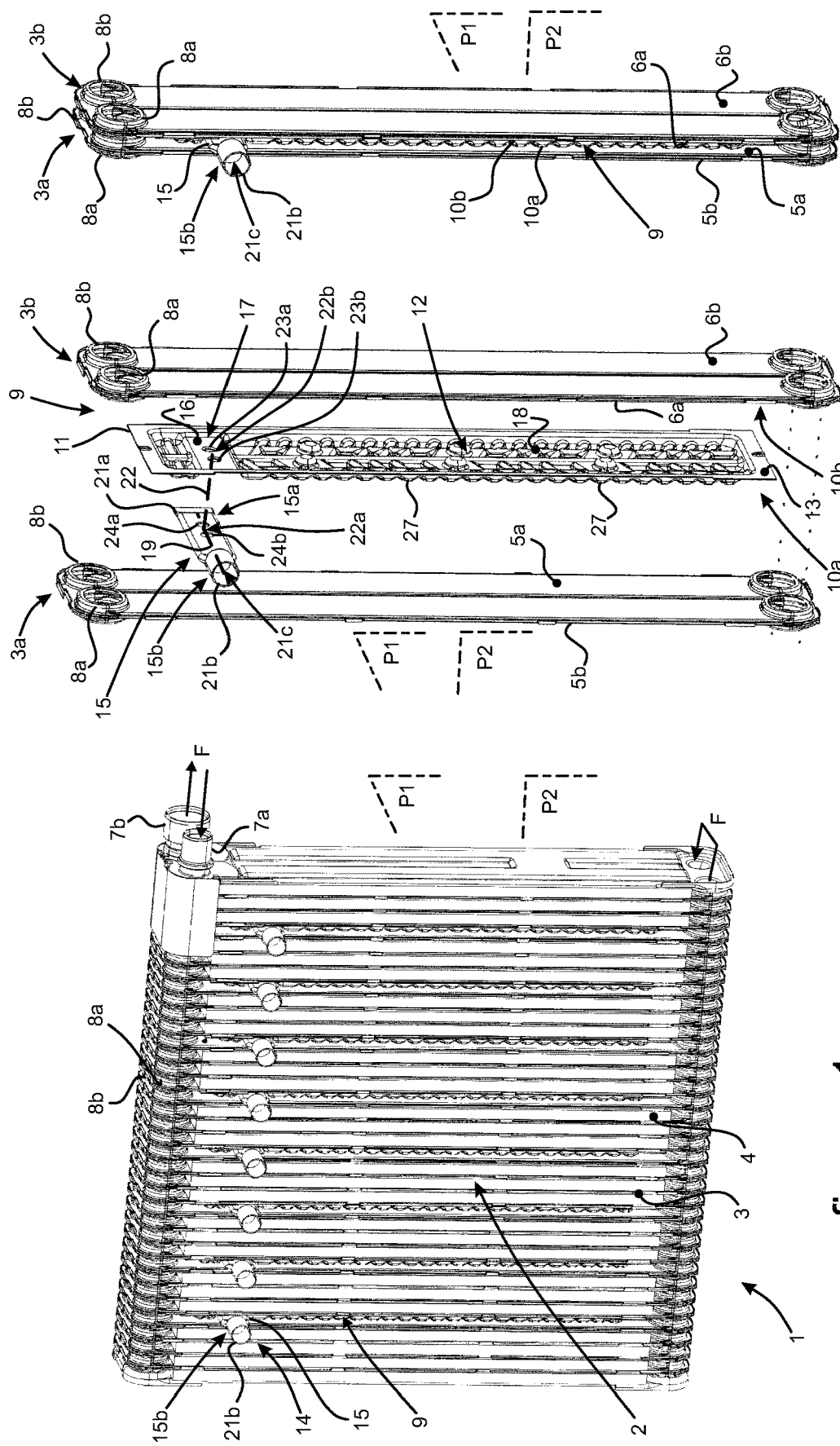

15 delimiting a filling channel 19 arranged outside the reservoir 9 against a first plate 10a of the reservoir 9.

19 Claims, 3 Drawing Sheets

(51) Int. Cl.
*F28D 20/02* (2006.01)
*F28D 20/00* (2006.01)

(52) U.S. Cl.
CPC .............. *F28D 2020/0008* (2013.01); *F28D 2020/0065* (2013.01); *F28F 2280/04* (2013.01); *Y02E 60/145* (2013.01)

(58) Field of Classification Search
CPC ...... F28D 2020/0008; F28D 2020/0065; F24F 5/0021; B60H 1/005; F28F 2280/04; Y02E 60/145
See application file for complete search history.

(56) References Cited

U.S. PATENT DOCUMENTS

2014/0174121 A1 6/2014 Hirayama et al.
2015/0107295 A1* 4/2015 Vreeland ................ B60H 1/005
62/515

FOREIGN PATENT DOCUMENTS

| FR | 3014183 A1 | 6/2015 |
| JP | H06-74602 A | 3/1994 |
| WO | 2013 125 533 A1 | 8/2013 |
| WO | 2014/208535 A1 | 12/2014 |

OTHER PUBLICATIONS

Written Opinion of the International Searching Authority issued in PCT/FR2017/050358 dated Jun. 9, 2017 (6 pages).

* cited by examiner

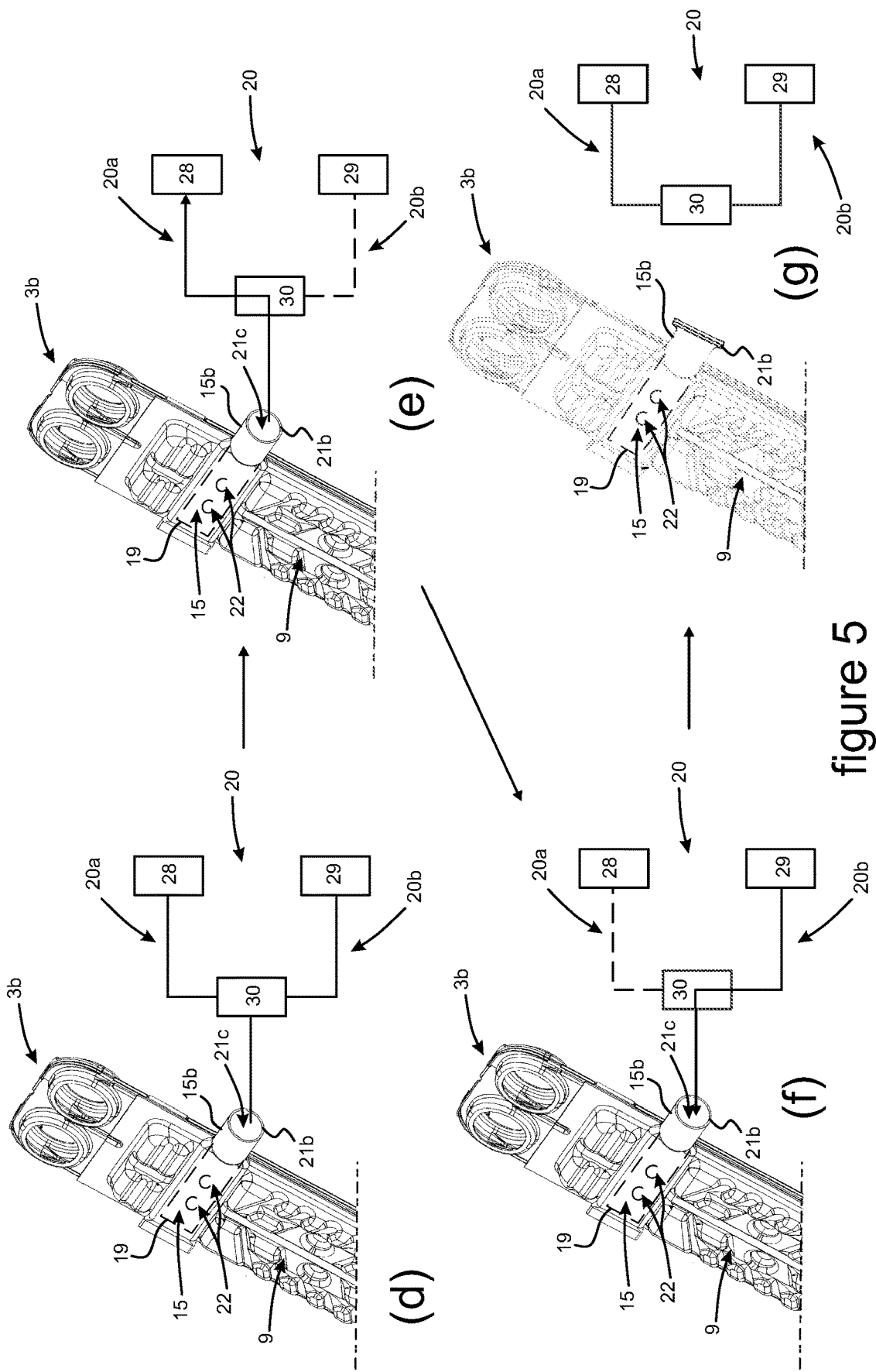

RESERVOIR OF PHASE-CHANGE MATERIAL EQUIPPED WITH A FILLING TUBE FOR FILLING THE SAID RESERVOIR FOR A HEAT EXCHANGER OF A MOTOR VEHICLE AIR CONDITIONING INSTALLATION

The present invention relates to the domain of heat exchangers fitted to motor vehicles, notably evaporators. The heat exchanger according to the present invention pertains more specifically to heat exchangers having at least one storage reservoir for a phase-change material (PCM). Such a reservoir typically comprises an intermediate heat-transfer member interposed between two canals conveying a coolant fluid through the heat exchanger.

Motor vehicles are commonly provided with a ventilation, heating and/or air-conditioning installation. Such an installation is notably used to condition the air contained in the passenger compartment of the vehicle, to replace and/or heat said air, or conversely to cool said air, depending on the requirements of the passengers.

For this purpose, the installation typically comprises a closed air-conditioning circuit through which a coolant fluid flows, supplying one or more heat exchangers, such as notably at least one evaporator. The air-conditioning circuit essentially comprises a compressor, a gas cooler or condenser, an expansion valve and the evaporator, arranged successively in the direction of flow of the fluid through the air-conditioning circuit. The fluid is thus compressed into gas phase by the compressor, transformed into liquid phase in the condenser or simply cooled by the gas cooler, expanded at low pressure by the expansion valve, then transformed into gas phase in the evaporator and again conveyed to the compressor.

A heat exchanger fitted to an air-conditioning installation of a motor vehicle commonly has a canal bundle. Each canal acts as a tube formed between two adjacent canal plates. The canals are arranged in parallel and separated from one another to form therebetween a space through which the air to be heat treated can flow. The canals are commonly mounted in parallel between an inlet canal and a discharge canal for the coolant fluid, respectively into and out of the heat exchanger.

Thus, with regard to such a heat exchanger acting as an evaporator, the coolant fluid admitted into the heat exchanger flows through the canals and is then discharged out of the heat exchanger to the compressor. The air to be cooled gives up calories after flowing through the spaces formed between the canals. Inserts are interposed between the canals to increase the heat-exchange surface with the air flow.

In this context, the present invention relates to the difficulties related to cooling the air flowing through the evaporator. Indeed, the compressor is commonly driven by the propulsion engine of the vehicle. When the engine is stopped, the flow of coolant fluid is interrupted and the heat exchange between the evaporator and the air to be cooled is significantly degraded. It is increasingly common for motor vehicles to be fitted with systems for automatically stopping the propulsion engine when the forward movement of the vehicle is temporarily interrupted.

To overcome this drawback, it is known to fit heat exchangers, and more specifically evaporators, with at least one storage reservoir for a phase-change material. Such a Phase Change Material is commonly referred to using the abbreviation PCM. Thus, when the air-conditioning circuit is in operation, the phase-change material gives up calories to the coolant fluid by solidifying. Stopping the compressor from being driven by the propulsion engine of the vehicle results in the air-conditioning circuit stopping. The air flowing through the heat exchanger is then cooled in contact with the reservoir or reservoirs containing the phase-change material, which draws calories from the air flow by liquefying.

An evaporator illustrating this context is disclosed in document WO2013125533A1 (SANDEN Corp.). The reservoir disclosed in this document is arranged between two reservoir plates arranged in half-shells and respectively in contact with two canals through which a fluid flows. To fill the reservoir, each reservoir plate has a nozzle forming a filling channel for the phase-change material.

Document FR3014183A1 (VALEO SYSTEMES THERMIQUES) discloses another evaporator adapted to the context set out above. The fluid canals are delimited by two canal plates and an intermediate plate is interposed between two canals. The PCM reservoir is then formed by the space between the intermediate plate and one canal plate.

The concepts set out above have a drawback relating to the filling of the storage reservoir for the phase-change material. Indeed, the filling nozzles in WO2013125533A1 cannot be transposed into the evaporator shown in document FR3014183A1, since the phase-change material reservoir in the first document is delimited by two plates designed specifically for the reservoir, while the second document only has a single plate.

In this context, the present invention relates to a reservoir for a phase-change material for a heat exchanger fitted to an air-conditioning installation of a motor vehicle. The present invention also relates to such a heat exchanger including one or more reservoirs according to the present invention. The present invention also relates to a method for filling a reservoir according to the present invention with a phase-change material.

The primary objective of the present invention is to improve the filling conditions of the reservoir, while optimizing the capacity thereof for a given space between the respective canal plates of two adjacent canals. Such an improvement is notably sought without having to modify the structure of the canal plates, which is ideally the same for all of the canal plates fitted to the heat exchanger, regardless of whether a reservoir is interposed therebetween.

The improvements sought also ideally entail strengthening the seal of the reservoir in consideration of the temperature variations applied to the reservoir when in operation, which are liable to affect the structural stability thereof.

The known economic constraints applied to original equipment manufacturers for motor vehicles should also be taken into consideration. The production costs of the heat exchanger should not be prohibitive in consideration of the advantages procured. The same applies more specifically to the reservoir and the heat exchanger to which the present invention relates, notably with regard to the structure of the reservoir and the methods for installing same on the heat exchanger, and with regard to the methods for filling same.

The PCM reservoir according to the present invention is designed to be a component of a heat exchanger of an air-conditioning installation of a vehicle, notably a motor vehicle. The reservoir is provided with filling means.

In this context, the reservoir according to the present invention is mainly identifiable in that the phase-change material reservoir is arranged between two reservoir plates, where the filling means comprise at least one tube delimiting a filling channel arranged outside the reservoir against a first of the reservoir plates.

The filling channel is arranged laterally in relation to the reservoir, i.e. beside the reservoir and in contact with an outer face of the first plate delimiting the reservoir. The concept of "lateral" relates to an arrangement of the filling channel against the first reservoir plate parallel to the general plane of this plate. The filling channel is thus primarily oriented across a width of the first plate delimiting the reservoir and enables the filling means to project outside the heat exchanger, i.e. beyond a plane defining an inlet or outlet face for the air flow through the canal bundle forming the heat exchanger. The position of the filling channel outside the reservoir means same is located outside the volume of the reservoir delimited between two reservoir plates, the feed channel linking an internal volume of the filling channel with an internal volume of the reservoir.

The reservoir advantageously includes any one of the following features, taken individually or in combination:

- a feed channel linking the filling channel to an internal volume of the reservoir delimited by the two reservoir plates,
- the filling channel lies in a main plane oriented parallel to a general plane of the reservoir plates, the feed channel extending along an axis oriented transverse to the general plane of the reservoir plates,
- the feed channel is formed by openings that communicate with one another and are formed respectively through the tube and through the first reservoir plate. The openings can be made easily by machining, or more advantageously by stamping during formation of the first reservoir plate,
- means are provided for positioning the tube on the first reservoir plate,
- the positioning means are at least one collar that surrounds at least a first opening and is fitted inside a second opening. Such a collar can be formed by forcing back material from the second opening when manufacturing the first reservoir plate by stamping,
- the collar projects from the first reservoir plate towards the outside of the reservoir. Similarly but conversely, the collar is formed as a projection from an external face of the filling channel to penetrate the opening formed in the first plate delimiting the reservoir. When installing the filling channel against the first reservoir plate, the collar is inserted into the opening in the tube to form the feed channel,
- the positioning means are designed so that a longitudinal axis of the filling channel is transverse to, and notably perpendicular to, a longitudinal axis of the reservoir plates. A series of passages delimited by the openings, for example with a circular section, can be provided. Alternatively, a single passage can be provided. Complementarily but optionally, such a passage can have an oblong section. In both cases mentioned here, angular pre-positioning of the filling means in relation to the reservoir is provided, and the filling means are made accessible from outside the heat exchanger, after the heat exchanger has been brazed,
- the tube is attached to a seat formed in the external face of the first reservoir plate,
- the seat delimits a feed chamber of the reservoir from the feed channel to a reserve extending the feed chamber in a longitudinal plane of the first reservoir plate,
- the combined dimensions of the feed chamber and the filling channel are at least equal to a dimension of the reserve, measured in a direction perpendicular to the general plane of the first reservoir plate,
- the filling means include at least one connection tip extending beyond a transverse dimension of the reservoir plates and that is designed to communicate the filling channel with an external feed circuit supplying the reservoir with phase-change material. It can be seen that the projection of a proximal portion of the connection tip out of the delimited volume between the reservoir plates enables same to be freely arranged and connected to the feed circuit, regardless of the arrangement of the filling channel.
- a distal end of the filling channel is closed by deforming the edges thereof, notably by bringing same towards one another and brazing, a proximal end of the connection tip being closed either by inserting a plug or by deformation of the edges thereof, notably by bringing same towards one another and brazing,
- the distal end of the filling channel is flattened such as to form a closing edge parallel to the general plane of the first reservoir plate.
- the first reservoir plate acts as an open shell on the second reservoir plate, the shell delimiting the volume of the reservoir and being sealed, notably by brazing, around the peripheral edge thereof surrounding the volume of the reservoir to the second reservoir plate,
- the reservoir is arranged in a plurality of niches, which are for example formed by cells formed by the reliefs on the first reservoir plate,
- the filling channel is attached by sealing, notably by brazing, for example simultaneously with the canal bundle, against the first reservoir plate.

Thus, the filling channel comprising the filling means of the reservoir is an attached member distinct from the reservoir plates between which the reservoir is formed. The methods for filling the PCM reservoir can be freely and specifically organized following such a structural distinction between the tube and the reservoir plates forming the reservoir. Furthermore, since the filling channel is attached to the first reservoir plate, a specific arrangement of just one of the reservoir plates is required to arrange the filling means of the reservoir. Subsequently, the arrangement of the second reservoir plate, delimiting the internal volume of the reservoir with the first reservoir plate, is made freely available.

Thus, the second reservoir plate can advantageously be formed by a canal plate that belongs to the heat exchanger and is identical to all of the canal plates of the heat exchanger. To reiterate, such a canal plate forms, with another adjacent canal plate, a canal of the heat exchanger conveying a fluid, notably a coolant, obtaining a heat exchange between the fluid, the PCM and the air.

The ultimate result is a freedom to organize the filling methods for the reservoir and optimization of the heat exchange between the reservoir' and the canals of the heat exchanger between which the reservoir is interposed.

According to a simple embodiment, the feed channel is formed by openings that are formed respectively through the tube and through the first reservoir plate. Said openings communicate with each other by being joined together according to the orientation of the outlets thereof, transverse and more specifically perpendicular to the general plane of the reservoir plates.

The present invention also relates to a heat exchanger, notably used as an evaporator of an air-conditioning installation of a vehicle, notably a motor vehicle. The heat exchanger according to the present invention is primarily identifiable in that it is provided with at least one storage reservoir for a phase-change material, as described above according to the present invention. Naturally, the heat exchanger preferably includes a plurality of PCM reservoirs according to the present invention, each one being interposed between two canals of the heat exchanger conveying a fluid, for example a coolant fluid, used to cool an air flow passing through the heat exchanger.

More specifically, following installation of the PCM reservoir in the heat exchanger, the second reservoir plate advantageously comprises a first canal plate of the heat exchanger that is identical to all of the canal plates in the heat exchanger. To reiterate, such a first canal plate conventionally forms, with an adjacent second canal plate, a first canal that is part of a canal bundle used to circulate a fluid through the heat exchanger.

The first reservoir plate is preferably placed, naturally along the general plane thereof, against a third canal plate. The third canal plate forms a second canal of the canal bundle with an adjacent fourth canal plate. Thus, the reservoir is placed directly in contact with two canal plates, forming respective adjacent canals of the heat exchanger. The heat exchange efficiency between the canal plates and the reservoir is thus optimized. The capacity of the reservoir is optimized along the dimension thereof perpendicular to the canal plates. The action and reaction time of the phase-change material is also improved by such a design. The reservoir can be easily interposed between two canal plates by replacing an insert fitted to the heat exchangers to facilitate heat exchange between the air to be cooled and the heat exchanger.

The invention also covers the case in which at least one first fluid flow canal is delimited by at least one first canal plate and by a second canal plate, as well as a second canal delimited by a third canal plate and by a fourth canal plate, and in which the second reservoir plate is distinct from any one of the canal plates.

The present invention also relates to a method for filling a phase-change material storage reservoir according to the present invention that includes a heat exchanger such as the one described above.

It can be seen that the method according to the present invention is proposed as an alternative to the methods usually used to fill a PCM reservoir installed on a heat exchanger, notably used as an evaporator, fitted to the air-conditioning installations for motor vehicles. It is therefore understood that the arrangement of the reservoir according to the present invention enables the reservoir to be filled by any other method than that advantageously proposed by the present invention. It is nonetheless specified that the methods commonly used to fill the reservoir can randomize optimization of the filling thereof.

Indeed, the reservoir according to the present invention is preferably arranged in a plurality of niches, which are for example formed by cells formed by the reliefs included on the first reservoir plate. The reliefs are advantageously built into the shell when same is being formed by stamping. Such a cellular arrangement of the reservoir ensures a uniform distribution of the PCM inside the reservoir. In this context, the optimized filling of each of the cells of the reservoir with PCM is difficult to achieve.

The arrangement of the reservoir according to the present invention advantageously makes it possible, according to a method provided for in the present invention, to fill the reservoir by aspiration of the PCM from the reservoir, following the prior pressure reduction thereof.

More specifically and for example, the method according to the present invention includes the following operations:

connecting the filling channel to a pressure-reduction apparatus, notably a vacuum pump. The filling channel is connected to the pressure-reduction apparatus via an open end of the filling channel, notably formed by the proximal end thereof acting as a connection tip to the feed circuit of the PCM reservoir.

reducing the pressure in the reservoir by aspiration of the air contained therein through the feed channel and the filling channel. Said aspiration is clearly obtained by activating the pressure-reduction apparatus previously connected to the filling channel via the connection tip.

interrupting the fluid communication between the filling channel and the pressure-reduction apparatus. Such an interruption of communication can for example be achieved using a valve to selectively communicate the reservoir on one hand with the pressure-reduction apparatus to reduce the pressure in the reservoir, and on the other hand with a source of phase-change material to fill same.

bringing the tube into communication with said source of phase-change material. As mentioned above, the filling channel can be brought into communication with the PCM source using the valve interposed between the pressure-reduction apparatus and the PCM source. Such communication causes the reservoir to be filled from the PCM source by aspiration, under the effect of the previous pressure reduction.

interrupting communication between the filling channel and the PCM source, then blocking the open end of the filling channel, which is notably formed by the proximal end thereof.

It is understood that the feed circuit of the PCM reservoir includes a depressurization circuit including the pressure-reduction apparatus. With regard to the reservoir, the depressurization circuit is notably placed in parallel with the PCM delivery circuit including the PCM source. The depressurization circuit and the delivery circuit for the PCM are alternatively brought into communication with the reservoir using said valve.

Figure 4:
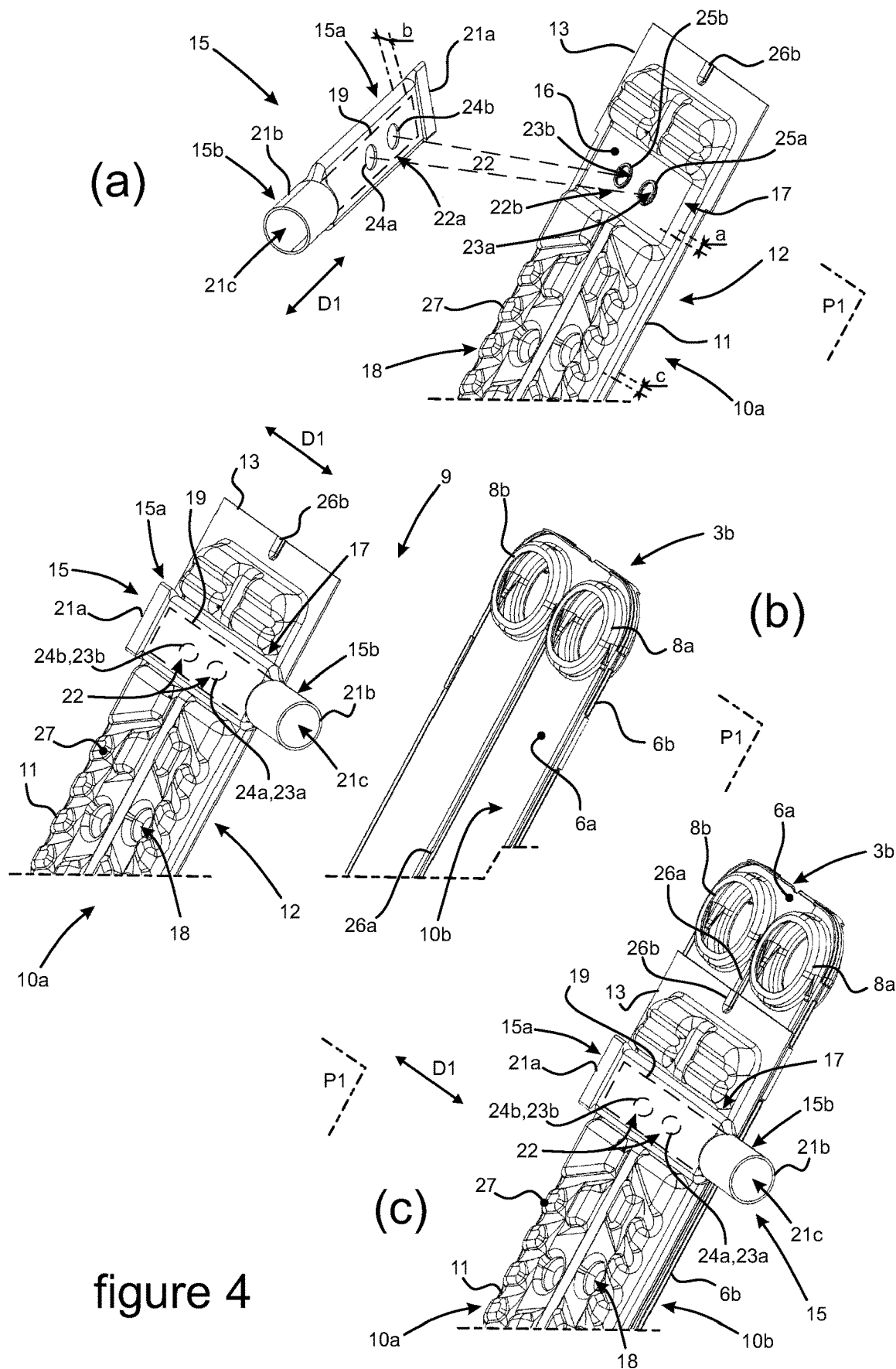

Other features, details and advantages of the present invention are set out more clearly in the description given below by way of example and in relation to the example embodiments of the invention illustrated in the attached figures, in which:

FIG. 1 is a perspective view of a heat exchanger according to the present invention, FIG. 2 and FIG. 3 are perspective views of components of the heat exchanger shown in FIG. 1, respectively an exploded view and an assembled view, FIG. 4 is made up of three diagrams (a), (b) and (c) showing successively the methods for assembling the components of a PCM reservoir according to the present invention in the heat exchanger shown in FIG. 1, FIG. 5 is made up of four diagrams (d), (e), (f) and (g) illustrating successively a method for filling the PCM reservoir shown in FIG. 3, It should first be noted that the figures show the present invention in detail and according to the specific embodiments thereof. Said figures and the description thereof can naturally be used where applicable to better define the present invention, in terms of the specific and general details thereof, notably in relation to the description of the present invention provided in this document.

Furthermore, to clarify and facilitate comprehension of the description provided of the present invention in relation to the attached figures, common members shown in the different figures are identified respectively in the specific description of these figures using the same reference numbers and/or letters, without implying the individual representation on each figure and/or an identical arrangement of said common members in the different specific embodiments.

In FIG. 1, a heat exchanger 1 according to the present invention is fitted to an air-conditioning installation of a motor vehicle. The heat exchanger 1 shown is more specifically used as an evaporator used to cool an air flow conveyed into the passenger compartment of the vehicle. The description below relates to a heat exchanger, but all of the arrangements described herein clearly also preferably apply to an evaporator.

The heat exchanger 1 has a canal bundle 2, the canals 3 of the canal bundle 2 being designed to convey a fluid F intended to capture calories with a view to cooling the air flow. Such a fluid can be a heat-transfer fluid, but can also be a coolant fluid, for example a two-phase fluid. Each canal 3 of the canal bundle 2 acts as a tube and is individually arranged between two canal plates, as shown for example in FIG. 2 and FIG. 3. Inserts 4, for example in the form of fins, are placed between most of the canals 3 to increase the heat-exchange surface between the air to be cooled and the heat exchanger 1.

More specifically, FIG. 2 and FIG. 3 show two adjacent canals 3a, 3b of the canal bundle 2 fitted to the heat exchanger shown in FIG. 1. Each of the canals 3a, 3b is formed between two canal plates 5a, 5b and 6a, 6b that extend primarily along the general plane P1 thereof, parallel to one another and perpendicular to the general plane P2 of the heat exchanger 1. As shown in FIG. 3, the canals 3a and 3b are arranged in parallel and separated from one another to form therebetween a space through which the air to be heat treated can flow.

As shown notably in FIG. 1, the canals 3 are arranged in parallel, from the point of view of the fluid F, between an inlet canal 7a and a discharge canal 7b for the fluid F. The inlet canal 7a and the discharge canal 7b have respective fluid passages 8a, 8b formed through the canal plates and joined successively to one another when the canals 3 are assembled with one another.

The fluid F is admitted into the heat exchanger 1 through the inlet canal 7a, flows through the canals 3 and is then discharged from the heat exchanger 1 through the discharge canal 7b. The canals 3 are arranged in two parallel fluid flow passes that are linked together at the base of the heat exchanger opposite the top thereof including the inlet canal 7a and the discharge canal 7b. For this purpose, the canal plates 5a, 5b and/or 6a, 6b are partitioned along the largest dimension thereof to form the two fluid passes. This largest dimension defines a longitudinal axis along which the canals lie.

Furthermore, the heat exchanger 1 includes a plurality of reservoirs 9 containing a phase-change material, referred to in the present document as PCM. Such reservoirs 9 enable the air flowing through the heat exchanger 1 to be cooled when no fluid F is flowing through the canals 3. Each reservoir 9 is interposed in contact between two canal plates used to form two respective adjacent canals 3. Thus, the reservoirs 9 are arranged between two adjacent canals 3 instead of the inserts 4, which are removed from the heat exchanger 1 for this purpose. Each of the reservoirs 9 is provided with means 14 for being filled with PCM when installed on the heat exchanger 1.

As shown more specifically in FIGS. 2 to 4, a reservoir 9 fitted to the heat exchanger 1 shown in FIG. 1 is formed between two adjacent reservoir plates 10a, 10b arranged parallel with one another. A first reservoir plate 10a acts as a shell 11, one of the faces 12 of which is open towards a second reservoir plate 10b. The peripheral edge 13 of the first reservoir plate 10a is brazed to the second reservoir plate 10b.

The second reservoir plate 10b can be a reservoir plate used exclusively for the reservoir 9 and be designed to be affixed against a canal plate of the neighboring heat exchanger 1, notably such as the canal plate 6a of the canal 3b. However, according to an advantage provided by the present invention, the second reservoir plate 10b is advantageously a first canal plate 6a forming a canal 3 of the heat exchanger 1, such as the canal 3b according to the preferred embodiment of the invention.

More specifically, the first canal plate 6a forms, with an adjacent second canal plate 6b, a first canal 3b of the heat exchanger 1. The first reservoir plate 10a formed by the shell 11 is advantageously directly opposite a third canal plate 5a forming, with an adjacent fourth canal plate 5b, a second canal 3a of the heat exchanger 1. It can be understood therefore that, according to this variant, the reservoir 9 is delimited on one side by the first reservoir plate 10a and by the first canal plate 6a, forming an embodiment of the second reservoir plate 10b.

To fill the reservoir 9, a tube 15 is attached laterally and fastened by brazing against a flat seat 16 formed in the external face of the shell 11. The seat 16 projects outwards from the first reservoir plate 10a, perpendicular to the general plane P1 thereof. The seat 16 delimits a feed chamber 17 (FIG. 4) for the PCM reservoir 9 that is arranged in the general plane P1 of the first reservoir plate 10a and extends a PCM reserve 18 forming most of the reservoir 9.

It can be seen that the tube 15 described below forms an envelope of the filling channel 19, these latter comprising the means 14 for filling the PCM-storage reservoir 9. The filling channel 19 is then a volume surrounded by the tube 15, this volume being filled by the phase-change material.

The tube 15 extends parallel to the general plane of the first reservoir plate 10a and is oriented along the longitudinal axis thereof perpendicular to the general plane P2 of the heat exchanger 1, as shown in FIG. 1.

More specifically and as shown in the diagrams in FIG. 4, the tube 15 forms, between the ends thereof in the general direction D1 of orientation thereof showing the longitudinal axis thereof, the filling channel 19 through which the PCM can be admitted into the reservoir 9 to fill same. It can be seen that, when the tube 15 is installed on the first reservoir plate 10a. The tube 15 is oriented in the direction D1 thereof and parallel to the smallest dimension of the first reservoir plate 10a, considered in the general plane P1 thereof. In other words, the longitudinal axis of the tube 15 is parallel to the transverse direction of the reservoir 9.

A distal portion 15a of the tube is seated between the reservoir plates 10a, 10b and forms a brazing join member of the tube 15 against the seat 16 formed on the first reservoir plate 10a. The distal portion 15a of the tube 15 is extended by a proximal portion 15b acting as a connection tip of the reservoir 9 for connecting to a feed circuit 20 (FIG. 5) of the PCM reservoir 9. The connection tip 15b of the filling means 14 projects from the canal bundle 2 of the heat exchanger 1, perpendicular to the general plane P2 thereof, as shown in FIG. 1. The concepts of distal and proximal are commonly understood to be relative opposing concepts relating to a given direction of orientation of a member. Naturally with regard to the tube, said given direction is identified as provided for between the ends of the tube.

The distal end 21a of the tube 15 forming the filling channel 9 is closed by deformation and sealing of the edges together, notably by bringing the edges thereof together and brazing. A proximal end 21b of the connection tip 15b forms an admission inlet 21c for the PCM into the tube 15 when filling the reservoir 9. The inlet 21c is held open while waiting for the reservoir 9 to be filled, and is closed after the reservoir 9 has been filled, as shown in diagram (g) in FIG. 5. The inlet 21b can be blocked by attaching a plug or, as illustrated, by deforming and sealing the edges of the proximal end 21b of the connection tip 15b together. Also in this case, this proximal end 21b of the connection tip 15 is closed by bringing the edges together and brazing said edges.

The filling channel 19 communicates with the feed chamber 17 by means of a feed channel 22. The feed channel 22 extends perpendicular to the general plane P1 of the first reservoir plate 10a and is formed by openings 22a, 22b that communicate with one another and are formed respectively through the tube 15 and through the seat 16. Each of the openings 22a, 22b has two adjacent holes 23a, 23b and 24a, 24b. The plurality of holes 23a, 23b and 24a, 24b forming respectively the openings 22a, 22b enables the openings 22a, 22b to be used to pre-position the tube 15 on the first reservoir plate 10a, notably to prevent the filling means 14 from rotating while the heat exchanger is being brazed.

For this purpose and as shown in diagram (a) in FIG. 4, each of the holes 23a, 23b is surrounded by a collar 25a, 25b. The collars 25a, 25b can be respectively fitted into the holes 24a, 24b formed in the tube 15. Thus, the tube 15 is rigorously positioned against the seat 16 and held in place subsequently by brazing to the first reservoir plate 10a.

The distal end 21a of the tube 15 is flattened by generating a force perpendicular to the general plane P1 of the first reservoir plate 10a. Perpendicular to the general plane P1 of the first reservoir plate 10a, the combined dimensions a, b of the feed chamber 17 and of the tube 15 respectively are at least equal to the dimension c of a PCM reserve 18 included in the reservoir 9. Thus, the tube 15 interposed between the first reservoir plate 10a and the canal 3a does not prevent the first reservoir plate 10a from being attached directly to the third canal plate 5a, optimizing the heat exchange therebetween.

In diagrams (a), (b) and (c) in FIG. 4, the reservoir 15 comprises exclusively three reservoir elements 10a, 10b, 15 assembled together by brazing, as shown in diagram (c). A first reservoir element is the first reservoir plate 10a, a second reservoir element is the second reservoir plate 10b, which may be a canal plate, and a third reservoir element is the tube 15 delimiting the filling channel 19.

Subsequently, as shown in diagram (a) then in diagram (b), the tube 15 is positioned on the first reservoir plate 10a by placing the distal portion 15a thereof against the seat 16. The collars 25a, 25b surrounding the holes 23a, 23b formed through the seat 16 are respectively inserted into the holes 24a, 24b formed through the tube 15.

Thus, as illustrated in diagram (b), a stack of canal plates and reservoir plates 10a, for example fitted with a tube 15, can be formed.

Subsequently and as shown in diagram (b) then in diagram (c), the assembly comprising the tube 15 pre-positioned against the first reservoir plate 10a is attached then brazed to the second reservoir plate 10b via the peripheral edge 13 of the first reservoir plate 10a. It should be noted that the second reservoir plate 10b includes a member 26a that partitions the canal 3b into two passes.

The reservoir 9 is then incorporated into the heat exchanger 1 following assembly of the first canal plate 6a advantageously forming the second reservoir plate 10b.

The reservoir 9 is interposed between two canals 3a, 3b of the heat exchanger 1 as shown in FIG. 1. The first reservoir plate 10a is arranged in direct contact with the third canal plate 5a. It can be seen that the shell 11 has reliefs 27 by means of which the first reservoir plate 10a bears against the third canal plate 5a. Inside the reservoir 9, such reliefs 27 form PCM-receiving cells distributed throughout the reserve 18.

In FIG. 5, the reservoir 9 is filled after rigid attachment thereof to the heat exchanger 1. The PCM reservoir 9 is filled by aspiration following a previous pressure drop in the reservoir 9. For this purpose and as shown in diagram (d), the reservoir 9 is connected to a PCM feed circuit 20 by means of a connection tip 15b of the tube 15, the outlet of which opens out to the outside.

The feed circuit 20 includes a depressurization circuit 20a and a PCM delivery circuit 20b, which are mounted in parallel on the feed circuit 20 by means of a valve 30. The depressurization circuit 20a includes a pressure-reduction apparatus 28 and the PCM delivery circuit includes a PCM source 29.

The pressure-reduction apparatus 28 and the PCM source 29 are mounted in parallel on the feed circuit 20 and connected individually to the valve 30. The valve 30 can be connected to the tube 15 by means of the connection tip 15b thereof to a hydraulic circuit, notably a feed circuit 20. The valve 30 enables the reservoir 9 to be selectively placed in communication with the pressure-reduction apparatus 28 or with the PCM source 29.

Thus, in diagram (e), the reservoir 9 is placed in communication with the pressure-reduction apparatus 28 by means of the valve 30. The air contained in the reservoir 9 is then aspirated out of the reservoir 9 and discharged through the depressurization circuit 20a. The reservoir 9 is then de-pressurized, i.e. a vacuum is created therein.

In the diagram (f), the reservoir 9 is then placed in communication with the PCM source 29 by means of the valve 30 and the PCM delivery circuit 20b. Following the prior pressure reduction in the reservoir 9, the PCM is aspirated through the feed circuit 20 from the PCM source 29 to the reservoir 9 to fill same. Thus, the set of cells in the reservoir 9 are effectively all filled with PCM and the efficiency of the heat exchange between the reservoir 9 and the air flow to be cooled is improved.

In diagram (g), the connection of the tube 15 to the PCM feed circuit 20 is interrupted and the proximal end 21b of the connection tip 15b forming the inlet 21c is blocked. This blocking is for example effected, as illustrated, by deforming the edges thereof, notably by bringing same towards one another, and brazing said edges together.

The phase-change material used to fill the reservoir 9 is paraffin based or can be based on saturated fatty acid esters derived from animal or vegetable fats.

The invention claimed is:

1. A phase-change material reservoir for a heat exchanger of an air-conditioning installation of a vehicle,
    the reservoir being arranged between two reservoir plates, and comprising at least one tube delimiting a filling channel arranged outside the reservoir against a first plate of the two plates of the reservoir,
    wherein the at least one tube delimiting the filling channel includes at least one connection tip extending beyond a transverse dimension of the reservoir plates and that communicates the filling channel with an external feed circuit supplying the reservoir with phase-change material.

2. The reservoir as claimed in claim 1, further comprising a feed channel linking the filling channel to an internal volume of the reservoir delimited by the two reservoir plates.

3. The reservoir as claimed in claim 2, wherein the filling channel lies in a main plane oriented parallel to a general plane of the reservoir plates, and wherein the feed channel extends along an axis oriented transverse to the general plane of the reservoir plates.

4. The reservoir as claimed in claim 2, wherein the feed channel is formed by openings that communicate with one another and are formed respectively through the tube and through the first reservoir plate.

5. The reservoir as claimed in claim 4, further comprising at least one collar surrounding at least a first opening and fitted inside a second opening.

6. The reservoir as claimed in claim 5, wherein the collar projects from the first reservoir plate towards the outside of the reservoir.

7. The reservoir as claimed in claim 5, in which the at least one collar is configured so that a longitudinal axis of the filling channel is transverse to a longitudinal axis of the reservoir plates.

8. The reservoir as claimed in claim 2, wherein the tube is attached against a seat formed in the external face of the first reservoir plate.

9. The reservoir as claimed in claim 8, wherein the seat delimits a feed chamber of the reservoir from the feed channel to a reserve extending the feed chamber] in a longitudinal plane of the first reservoir plate.

10. The reservoir as claimed in claim 9, in which, in a direction perpendicular to the general plane of the first reservoir plate, the combined dimensions of the feed chamber and of the tube are at least equal to a dimension of the reserve.

11. The reservoir as claimed in claim 1, in which a distal end of the filling channel is closed by deforming the edges thereof and in which a proximal end of the connection tip is closed either by a plug or by deforming the edges thereof.

12. The reservoir as claimed in claim 1, wherein the first reservoir plate acts as an open shell arranged on the second reservoir plate, the shell delimiting the volume of the reservoir and being sealed via the peripheral edge thereof surrounding the volume of the reservoir to the second reservoir plate.

13. A method for filling the reservoir as claimed in claim 1, the method comprising filling the reservoir by aspiration of the phase-change material after the pressure in the reservoir has been reduced.

14. The method for filling the reservoir as claimed in claim 13, further comprising:
connecting the at least one tube delimiting the filling channel to a pump;
reducing the pressure in the reservoir by aspiration of the air contained therein through the feed channel and the filling channel;
bringing the tube into communication with a source of phase-change material, causing the reservoir to be filled by aspiration from the source of phase-change material under the effect of the negative pressure therein; and
blocking a proximal end of a connection tip.

15. A heat exchanger of an air-conditioning installation of a vehicle, comprising:
at least one phase-change material reservoir arranged between two reservoir plates; and
at least one tube delimiting a filling channel arranged outside the reservoir against a first plate of the reservoir,
wherein the at least one tube delimiting the filling channel includes at least one connection tip extending beyond a transverse dimension of the reservoir plates and that communicates the filling channel with an external feed circuit supplying the reservoir with phase-change material.

16. The heat exchanger as claimed in claim 15, comprising at least one fluid flow canal delimited by at least one first canal plate and by a second canal plate, in which the second reservoir plate is one of the canal plates.

17. The heat exchanger as claimed in claim 15, wherein the first reservoir plate is linked thermally to a second canal delimited by a third canal plate and by a fourth adjacent canal plate.

18. The heat exchanger as claimed in claim 15, further comprising at least one fluid flow canal delimited by at least one first canal plate and by a second canal plate, as well as a second canal delimited by a third canal plate and by a fourth canal plate, wherein the second reservoir plate is distinct from any one of the canal plates.

19. A phase-change material reservoir for a heat exchanger of an air-conditioning installation of a vehicle,
the reservoir being arranged between two reservoir plates, and comprising at least one tube delimiting a filling channel arranged outside the reservoir against a first plate of the two plates of the reservoir; and
a feed channel linking the filling channel to an internal volume of the reservoir delimited by the two reservoir plates,
wherein the filling channel lies in a main plane oriented parallel to a general plane of the reservoir plates, and wherein the feed channel extends along an axis oriented transverse to the general plane of the reservoir plates.

* * * * *